Patented Sept. 19, 1922.

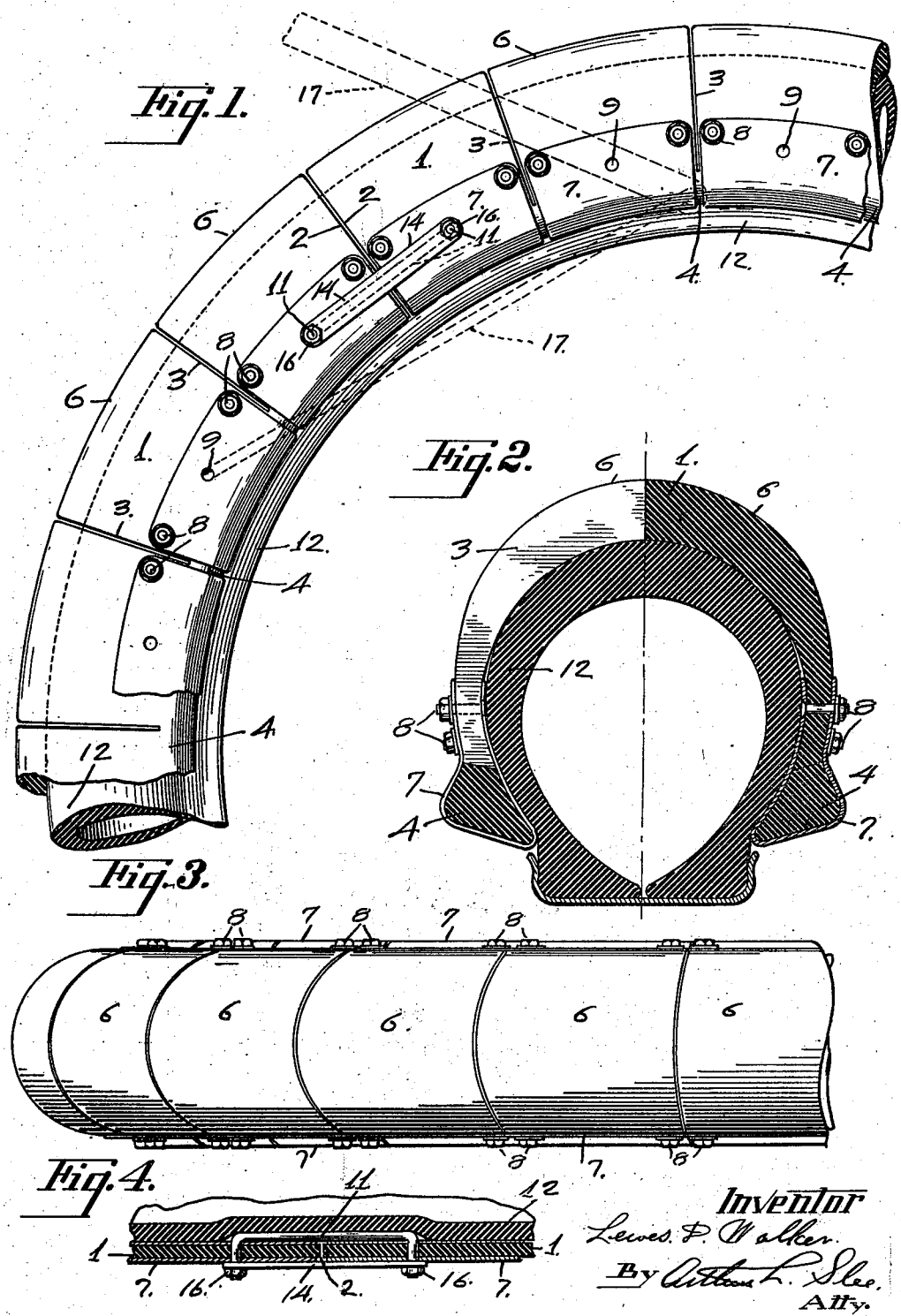

1,429,659

UNITED STATES PATENT OFFICE.

LEWES D. WALKER, OF SACRAMENTO, CALIFORNIA.

OVERTIRE.

Application filed February 23, 1922. Serial No. 538,780½.

*To all whom it may concern:*

Be it known that I, LEWES D. WALKER, a citizen of the United States, residing in the city of Sacramento, in the county of Sacramento and State of California, have invented a new and useful Improvement in an Overtire, of which the following is a specification.

My invention relates to improvements in over-tires wherein a motor vehicle tire shoe or casing is cut through at one point to provide two adjacent ends to interrupt the continuity of said tire and cut through the tread transversely and to the beads at regular intervals between said ends to provide a series of separate tread sections.

The primary object of the present invention is to provide a new and improved over-tire for motor vehicles and the like.

Another object of the invention is to provide a new and improved over-tire adapted for application to the tires of a motor vehicle, which shall increase tractive facilities of said tires.

A further object is to provide a new and improved device of the character set forth having a series of tread sections which may be formed by cutting the tread of a "seconds" tire at regular intervals through the bead portions thereof, and cutting said tire entirely through said section and beads at one point to provide two ends to facilitate the application of said over-tire to said tire.

A still further object is to provide reinforcing means detachably connected to each section at each side thereof and embracing the adjacent bead portion whereby said tire sections may be more firmly connected to said bead portions and also to provide means for replacing a worn section and suitably and firmly connecting it to the adjacent bead portions.

I also provide a suitable means for detachably connecting the ends of the over-tire to facilitate application and removal of said over-tire to a vehicle tire.

I accomplish these and other objects by means of the device disclosed in the drawings forming a part of the present specification, wherein like characters of reference are used to designate similar parts throughout the said specification and drawings, and in which:—

Fig. 1 is a broken side elevation of a motor vehicle tire disclosing my improved over-tire applied thereto;

Fig. 2 is an enlarged sectional view of a tire or shoe, one-half of said section being taken in mid-section, and the other half between sections, of the over-tire;

Fig. 3 is a broken plan view of Fig. 1; and

Fig. 4 is an enlarged broken detailed view of a portion of one side of the over-tire, adjacent the two ends thereof, disclosing the manner in which one of the U-bolts is applied to detachably connect said ends.

Referring to the drawings the numeral 1 is used to designate in general an over-tire comprising a casing separated at one point as at 2 to provide two ends and cut transversely at regular intervals through the tread as at 3 to the bead portions 4 thereof thereby providing a series of separate tread sections 6, connected by said bead portions 4.

Each tread section 6 is provided at its junction with the adjacent bead portions 4 thereof with preferably metallic shoes 7 arranged to embrace the adjacent bead portions 4 and having their free ends extending radially to engage the sections 6. The shoes 7 are each provided with centrally disposed apertures 9 and are detachably secured to their respective sections 6 by means of suitable bolts 8.

In order to effectively and conveniently secure the two ends of the over-tire in position I have provided a pair of U-bolts 11 interposed between the over-tire 1 and the shoe or casing 12 of the motor vehicle with the free ends of said U-bolts 11 projecting outwardly through the apertures 9 of the shoes 7 adjacent the said two ends, as disclosed in Figs. 1 and 4 of the drawings. To assist said U-bolts 11 a link 14 is provided having its ends apertured to receive the free ends of said U-bolts 11 said link being retained in such engaging relation by means of suitable nuts 16.

The apertures 9 are provided in all of the shoes 7 for the reception of a suitable tool 17 indicated in dotted lines in Fig. 1 of the drawings whereby the two ends of the over-tire 1 may be drawn together to properly position said over-tire 1 upon the shoe or casing 12 of the vehicle, and to so hold said over-tire in position while the one of the free ends of the U-bolt 11 is being inserted through its respective aperture 9 in the shoe 7 adjacent one of said ends of said over-tire 1.

In this manner I have provided an over-tire comprising a series of sections connected by the beads of the over-tire. When any one of said sections 6 is cut or worn it may be cut away from the beads 4 and a new section inserted and secured in position by the adjacent shoe 7.

It should be noted that the metallic shoes 7 extend over the side walls of the shoe or casing 12 thereby protecting said side walls from cuts and bruises. The application of the over-tire also provides a deepened or thickened tread portion which will tend to prevent punctures and stone bruises and wear of the shoe or casing 12. By reason of the separate sections 6 traction is facilitated and there is a tendency to prevent skidding.

Having thus described my invention what I claim as new and desire to secure by Letters Patent is:

1. An over-tire comprising a casing separated at one point to provide two ends and cut at regular intervals between said ends through the tread and to the beads thereof to provide tread sections; and means for detachably connecting said ends to retain said over-tire in position upon a vehicle tire.

2. An over-tire comprising a casing separated at one point to provide two ends and cut at regular intervals between said ends through the tread and to the beads thereof to provide tread sections; U-bolts connecting said ends and having the shank thereof interposed between said over-tire and a vehicle tire to retain said bolts in engaging relation with said over-tire.

3. An over-tire comprising a casing separated at one point to provide two ends and cut at regular intervals between said ends through the tread and to the beads thereof to provide tread sections; U-bolts connecting said ends and having the shank thereof interposed between said over-tire and a vehicle tire to retain said bolts in engaging relation with said over-tire; links connecting the free ends of the U-bolts; and means for retaining said links and U-bolts in engaging relation.

4. An over-tire comprising a casing separated at one point to provide two ends and cut at regular intervals between said ends through the tread and to the beads thereof to provide tread sections; and separate reinforcing members detachably connected to each tread section to prevent separation of said sections from the beads.

5. An over-tire comprising a casing separated at one point to provide two ends and cut at regular intervals between said ends through the tread and to the beads thereof to provide tread sections; separate reinforcing members detachably connected to each tread section to prevent separation of said sections from the beads; and means for detachably connecting said ends to retain said over-tire in position upon a vehicle tire.

6. An over-tire comprising a casing separated at one point to provide two ends and cut at regular intervals between said ends through the tread and to the beads thereof to provide tread sections; means for detachably connecting said ends to retain said over-tire in position upon a vehicle tire; and shoes detachably connected to each section and embracing adjacent portions of the beads to prevent separation of said sections from said beads.

7. An over-tire comprising a casing separated at one point to provide two ends and cut transversely through the tread to the beads thereof at regular intervals between said ends to provide tread sections; shoes detachably connected to each section and embracing adjacent portions of the beads to prevent separation of said sections from said beads; each of said shoes being provided with centrally disposed apertures for the engagement of a placing and removing tool whereby said over-tire may be placed and removed.

8. An over-tire comprising a casing separated at one point to provide two ends and cut transversely through the tread to the beads thereof at regular intervals between said ends to provide tread sections; shoes detachably connected to each section and embracing adjacent portions of the beads to prevent separation of said sections from said beads; each of said shoes being provided with centrally disposed apertures for the engagement of a placing and removing tool whereby said over-tire may be placed and removed; and means for detachably engaging the ends of the over-tire to secure the same over a vehicle tire.

9. An over-tire comprising a casing separated at one point to provide two ends and cut transversely through the tread to the beads thereof at regular intervals between said ends to provide tread sections; shoes detachably connected to each section and embracing adjacent portions of the beads to prevent separation of said sections from said beads, each of said shoes being provided with centrally disposed apertures for the engagement of a placing and removing tool whereby said over-tire may be placed and removed; U-bolts detachably engaging the centrally disposed apertures of the shoes adjacent the two ends of the over-tire; and means for engaging the free ends of said U-bolts to retain the same in position to lock said over-tire upon a vehicle tire.

In witness whereof I hereunto set my signature.

LEWES D. WALKER.